United States Patent [19]

Miller

[11] Patent Number: 5,257,393
[45] Date of Patent: Oct. 26, 1993

[54] SERIALLY CONTROLLED PROGRAMMABLE TEST NETWORK

[75] Inventor: Jon R. Miller, Goleta, Calif.

[73] Assignee: JRM Consultants, Inc., Santa Barbara, Calif.

[21] Appl. No.: 850,221

[22] Filed: Mar. 12, 1992

Related U.S. Application Data

[63] Continuation of Ser. No. 341,162, Apr. 19, 1989, abandoned.

[51] Int. Cl.$^5$ .................. G06F 11/00; G06F 11/34
[52] U.S. Cl. .................. 395/800; 395/575; 395/425; 395/200; 364/DIG. 1; 364/267.0; 364/267.4; 364/267.3; 364/264.0; 364/264.1; 364/265.6; 364/265.2
[58] Field of Search .......... 395/800, 275, 775, 250, 395/500, 575, 425; 340/835.5

[56] References Cited

U.S. PATENT DOCUMENTS

| | | | |
|---|---|---|---|
| H696 | 10/1989 | Davidson | 364/200 |
| 4,358,825 | 11/1982 | Kyu et al. | 364/200 |
| 4,451,898 | 5/1984 | Palermo et al. | 364/900 |
| 4,477,882 | 10/1984 | Schumacher et al. | 364/900 |
| 4,506,324 | 3/1985 | Healy | 364/200 |
| 4,672,613 | 6/1987 | Foxworthy et al. | 371/38 |
| 4,723,120 | 2/1988 | Petty, Jr. | 340/825.02 |
| 4,794,592 | 12/1988 | Caine et al. | 370/85 |
| 4,845,609 | 7/1989 | Ligthart et al. | 395/275 |
| 4,847,829 | 7/1989 | Tompkins et al. | 370/62 |
| 4,864,291 | 9/1989 | Korpi | 340/825.5 |
| 4,864,532 | 9/1989 | Reeve et al. | 364/900 |
| 4,888,727 | 12/1989 | Getson et al. | 364/900 |
| 4,901,342 | 2/1990 | Jones | 379/93 |
| 4,905,184 | 2/1990 | Giridhar et al. | 364/900 |
| 4,949,245 | 8/1990 | Martin et al. | 364/200 |
| 4,959,773 | 9/1990 | Landers, Jr. | 364/200 |
| 4,962,378 | 10/1990 | Fadem | 340/825.5 |
| 4,965,801 | 10/1990 | DuLac | 371/40.1 |
| 4,975,829 | 12/1990 | Clarey et al. | 364/200 |

Primary Examiner—Robert B. Harrell
Assistant Examiner—L. Donaghue
Attorney, Agent, or Firm—Lyon & Lyon

[57] ABSTRACT

A connector and data analyzer operate with a network of data storage devices connected to a serial data link. An arbitrarily large number of data storage devices may be connected via a serial data link with use of the connectors. Each device is connected to the serial data link by a connector. In one aspect of this invention, the converter is a microprocessor based system which functions to interface with the serial data link network and the bus attached to the peripheral device. In one embodiment, the microprocessor based system is generally composed of a network processor system and a device processor system. The converter may comprise a network processor which functions to maintain network continuity, monitors the serial data link for commands to the selected peripheral device, and provides command and information to a programmable device processor portion of the converter. The programmable device processor is configurable to interface with various bus requirements, and transfers control and data information to and from the peripheral device over the device bus. An important application of this invention is in providing a network for testing or analyzing peripheral devices via a host computer.

5 Claims, 7 Drawing Sheets

SERIALLY CONTROLLED PROGRAMMABLE TEST NETWORK

This application is a continuation of application No. 07/341,162 filed Apr. 19, 1989, now abandoned.

FIELD OF THE IVNENTION

This invention relates to networks for attaching one or more data storage devices to a serial data link. More particularly, one aspect of the invention relates to a converter attached between the serial data link and a device bus servicing a data storage device. In one application of this invention, the network is useful for establishing a test network for a plurality of data storage devices.

BACKGROUND OF THE INVENTION

It is often necessary or advantageous to attach a host computer to one or more peripheral devices. Commonly used peripheral devices would include data storage devices, such as disk drives or tape drives. The peripheral device is usually interfaced by means of a bus system. A variety of bus systems are known to the art, including the Storage Module Device (SMD), Enhanced Small Disk Interface (ESDI), ST506 and Small Computer Interface (SCSI). To take one example, the SCSI bus would allow high speed parallel transfer of various types of information, including commands, messages, status and data, from a disk drive with a SCSI interface. The parameters of the SCSI computer bus are defined by agreed upon industry standards, such as ANSI Committee Standard X3.131 1986, and the SCSI-2 standard defined in ANSI working draft X3T9.2/86-109. Devices attached to a SCSI bus are said to operate in the initiator mode if they are the host computer or system, and to operate in the target mode if they are the peripheral device.

Direct attachment of one or more data storage devices to a host computer has typically required that the host computer include a controller to instruct the peripheral device. In the case of attachment of one or more SCSI data storage devices the host computer is required to contain a SCSI controller, sometimes referred to as a SCSI host adapter. In practice, the physical attachment of a number of SCSI data storage devices to a host computer over a SCSI bus consists of one or more wide cables running between the host computer and the SCSI data storage devices. Typically, a maximum of seven SCSI data storage devices may be attached to a host computer with a single SCSI bus.

Testing of peripherals is one known application of networking more than one peripheral device to a host computer. Again with respect to SCSI data storage peripherals, there exist a large number of computer based SCSI analyzers or testers on the market. All of these testers require the use of an SCSI host adapter to attach SCSI devices to the host computer. Further, the computer software to operate SCSI analyzers resides entirely in the host computer which contains the SCSI host adapter. One direct result of this is that the computer software for such SCSI analyzers must maintain a separate control structure for each of the SCSI devices being analyzed. Maintaining such multiple control structures is disadvantageous, in part because it is a complicated and demanding task.

Yet another disadvantage of the currently available systems is the complexity of the networking software residing in the host computer. This arises primarily because the host computer maintains communications with more than one network device at a time by means of interleaving multiple communications onto the network. This interleaving of communications places an additional burden on the host computer.

Yet a further disadvantage of the prior systems is their limited number of devices which can be economically tested with one host computer.

SUMMARY OF THE INVENTION

Interaction between a host computer and one or more peripheral devices is achieved by having a serial data link which runs to all of the peripheral devices. A converter connects the serial data link to the bus by which the peripheral device is interfaced. The converter (also referred to as a converter and analyzer) may perform analysis of the data or information passed through it. In one aspect of this invention, the converter is a microprocessor based system which functions to interface with the serial data link network and the bus attached to the peripheral device. In one embodiment, the microprocessor based system is generally composed of a network processor system and a device processor system. The converter may comprise a network processor which functions to maintain network continuity, monitors the serial data link for commands to the selected peripheral device, and provides command and information to a programmable device processor portion of the converter. The programmable device processor is configurable to interface with various bus requirements, and transfers control and data information to and from the peripheral device over the device bus.

An important application of this invention is in providing a network for testing or analyzing peripheral devices via a host computer. In the preferred embodiment of this invention, a host computer is capable of testing or analyzing an arbitrarily large number of peripheral devices, such as data storage devices, by means of a serial data link. Each peripheral device to be tested or analyzed is presumed to operate in accord with defined bus parameters. A converter in accord with this invention is utilized between the bus for each peripheral device and the serial data link. Each converter is a self-contained computer processing unit capable of analyzing and/or processing the bus transactions. In one implementation of a test, the host computer would issue an address indicative of the peripheral device to be tested. All converters would receive the address over the serial data link, and the converter having that address would be activated. The activated converter would then operate and identify test procedures, or could receive test software from the host computer over the serial data link. The network processor portion of the converter would provide the necessary command and data information to the device processor portion of the converter. The latter portion would directly interface with the system bus for the peripheral device. Since each converter has sufficient computing abilities and program to operate independently of the host computer, each converter can conduct test procedures independently of the host computer and other converter/peripheral device combinations. In this way, a single host computer can effectively control an arbitrarily large number of peripheral devices.

In the field of SCSI analyzers, sufficient and flexible hardware features are built into the adapter by means of reprogrammable logic circuitry to allow a variety of measurements applicable to the testing of SCSI storage devices. With the use of reprogrammable logic, new hardware features may be added as needed in each converter by simply down loading the new configuration information from the host computer to the desired converter. The reprogrammable logic circuits may be redefined at any time from the host computer for each individual converter without any physical hardware modifications.

An ability of the test aspects of this invention is the capability of creating error conditions either through the generation of illegal state sequences or through the ability to force illegal SCSI bus parity. This error simulation capability is provided in the converter through the use of a diagnostic latch with open collector cable drivers.

Accordingly, an object of the present invention is to provide an improved method of accessing an arbitrarily large number of computer peripherals, particularly those employing a device bus such as the SCSI data storage device.

Another object of this invention is to provide a test network for a plurality of peripheral devices.

Yet a further object of this invention is to provide a test network which is capable of creating independent error conditions on multiple busses either through the generation of legal state sequences or through the forcing of illegal sign values such as illegal parity.

DETAILED DESCRIPTION OF THE DRAWINGS

While the invention is described with respect to the SCSI device bus, the invention has application to any type of bus structure. Any arbitrary number of peripheral devices may be attached to the serial data link using this apparatus and technique. Information over the serial network is organized into messages, which may be globally addressed to all devices on the network or directly addressed to one of the many peripheral devices on the network. Message addressing is accomplished by logically connecting a particular converter to the network upon receipt of the command of the host computer. In one aspect of this invention, one or more converters may reassign network addresses upon receipt of a command from the host computer. Information flowed towards the host computer is referred to as upstream while information flowed away from the host computer is referred to as downstream. Each converter passes along messages in both the upstream and downstream directions, processes messages addresses to it and sends messages to the host computer.

Figure 1:
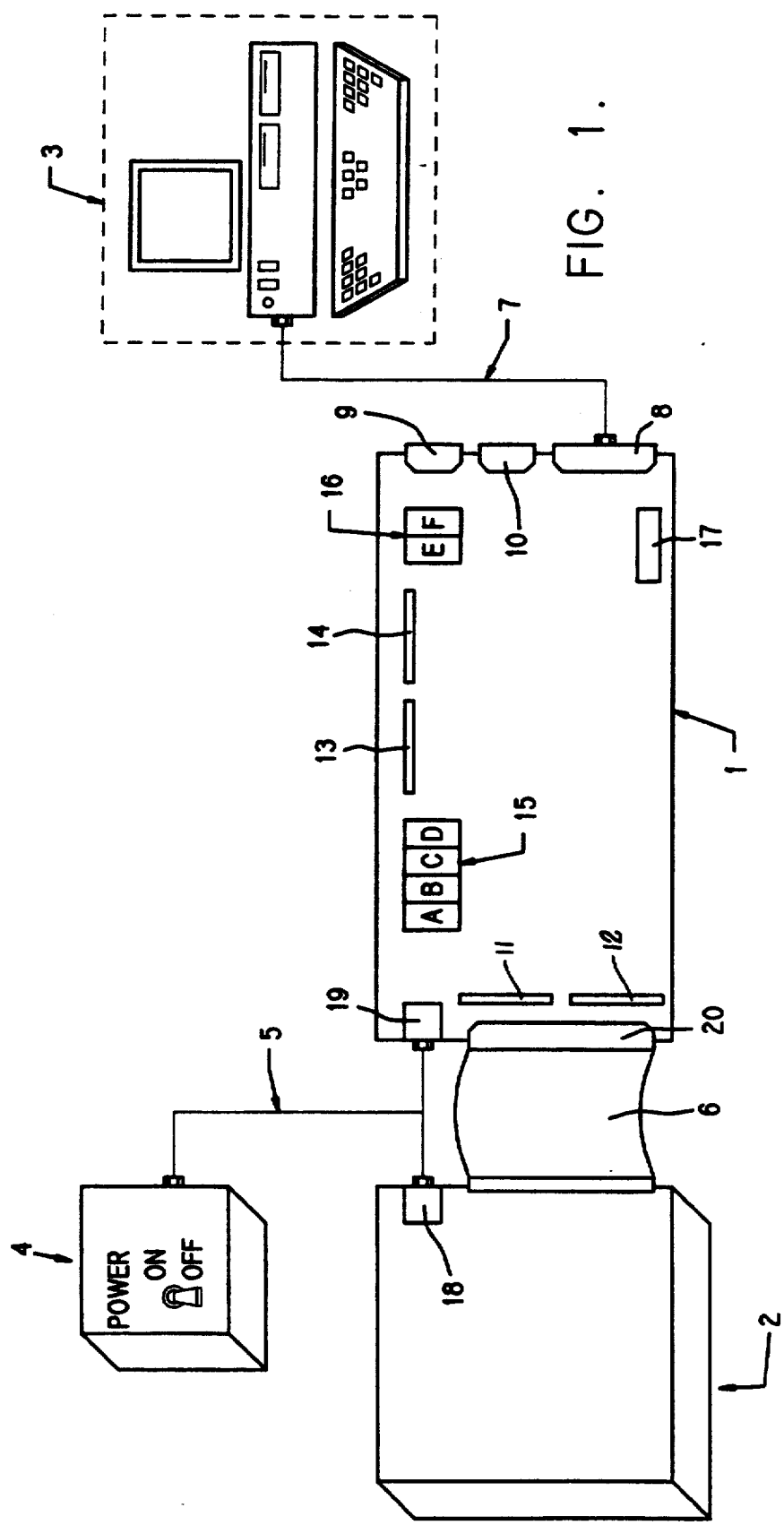
FIG. 1 is a perspective view of a peripheral device attached to the host computer via a converter and a serial data link.

In FIG. 1, a converter 1 is shown attached to SCSI Device 2 and a Host Computer System 3. The converter 1 and the SCSI Device 2 both receive their power from a common power supply 4. Power is delivered via a 4 wire cable 5 to power connectors 18, 19. In this example, SCSI Device 2 is attached to the converter via a flat cable 6 to the SCSI Connector 20. The converter 1 is attached to the Host Computer System 2 via a 3-wire serial cable 7. The serial cable 7 is attached to the RS-232 connector 8. Alternatively, the Host Computer could attach to the upstream RS-422 connector 9, if using a host computer with that type of connection. If another converter were present, then the downstream RS-422 connector 10 would be connected to the upstream connector of the next converter.

As many or as few status displays may be used on the converter. In the preferred embodiment, the converter displays the condition of each of the SCSI Bus signals via a set of LEDs 11 for the 9 SCSI data signals, and via a set of LEDs 12 for the 9 SCSI control/status signals. Status of the built-in SCSI processor is displayed in another set of LEDs 13, while status of the built-in network processor is displayed in a set network LEDs 14. A 4-character alphanumeric display 15 is maintained by the built-in SCSI processor while a 2-character alphanumeric display 16 is maintained by the built-in network processor. Mode control switches 17 allow special operations such as stand alone burn-in.

Figure 2:
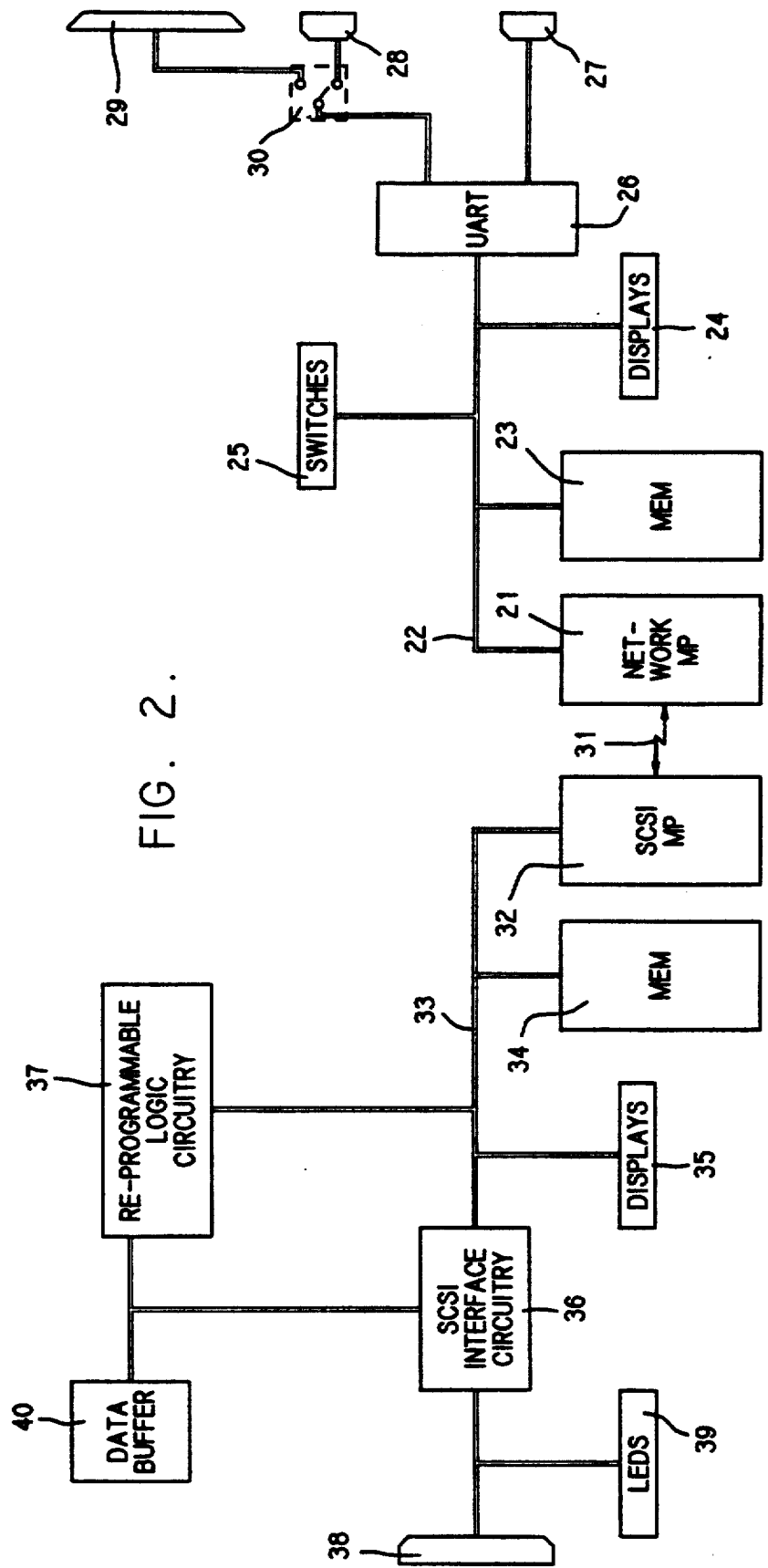
FIG. 2 is a block diagram of the converter.

FIG. 2 shows a block diagram of the converter. The network processor 21 is attached via one or more internal address-data-control bus 22 to program and data memories 23, to displays 24, previously described, to mode switches 25 and to a dual-channel UART 26. UART is short-hand for Universal Asynchronous Receiver Transmitter. In turn, one channel of the UART 26 is connected to a downstream RS-422 link 27. The other channel of the UART is connected either to an upstream RS-422 link 28 or to an RS-232 link 29; the selection between the upstream RS-422 link 28 and the RS-232 link 29 is made via a jumper 30. The network processor 21 and the SCSI processor 32 are connected via an internal serial link 31.

The SCSI processor 32 is attached via an internal address-data-control bus 33 to program and data memories 34, to displays 35, to the SCSI interface circuitry 36 and to reprogrammable logic circuitry 37. The functions of the reprogrammable logic device include the ability to control data flowing to and from the connector. The reprogrammable logic circuitry 37 also controls access to the data buffer memory 40 from the SCSI interface circuitry 36. In particular, the reprogrammable logic circuitry functions as a DMA (direct memory access) controller, a real-time pattern generator and a real-time pattern recognizer all in regards to data which is either written to or read from the device. These functions may be tailored for particular applications by means of the reprogrammability feature of the circuitry. For example, data blocks might be pre-fixed with specialized headers whose contents would be used to activate or deactivate circuits in the programmable logic array. In the preferred embodiment, a XILINX 3020-70 programmable logic device is used.

The SCSI Interface circuitry 36 is connected to the SCSI connector 38. The SCSI interface circuitry 36 may consist of a protocol IC in combination with various diagnostic circuits which allow the simulation of erro conditions. The SCSI protocol IC may perform such tasks as handshaking data, command, status and message bytes to and from the device. The SCSI protocol IC can report state changes on the device SCSI bus. The SCSI protocol IC also allows direct access to the bits on the device SCSI bus from the converter's device processor. In the preferred embodiment, the SCSI interface circuitry 36 is an AIC-6250L SCSI protocol IC. Also attached to the SCSI connector 38 are LEDs 39 which display the state of each SCSI signal.

In operation, the host computer 44 dan access any or all of the converters attached to the serial data link 55. Addressing may be done by sending a string of characters, e.g., ASCII character, over the serial data link. Once addressed, the converter can communicate with the host computer 44. Each converter can perform all of the possible commands necessary for a given interface. In the case of the SCSI interface, those commands would include things such as: moving data to and from the disk drive, positioning the drive, querying the drive, changing the mode of the device, reformatting, changing the number of cylinders on the disk drive and identifying bad cylinders.

Figure 3:
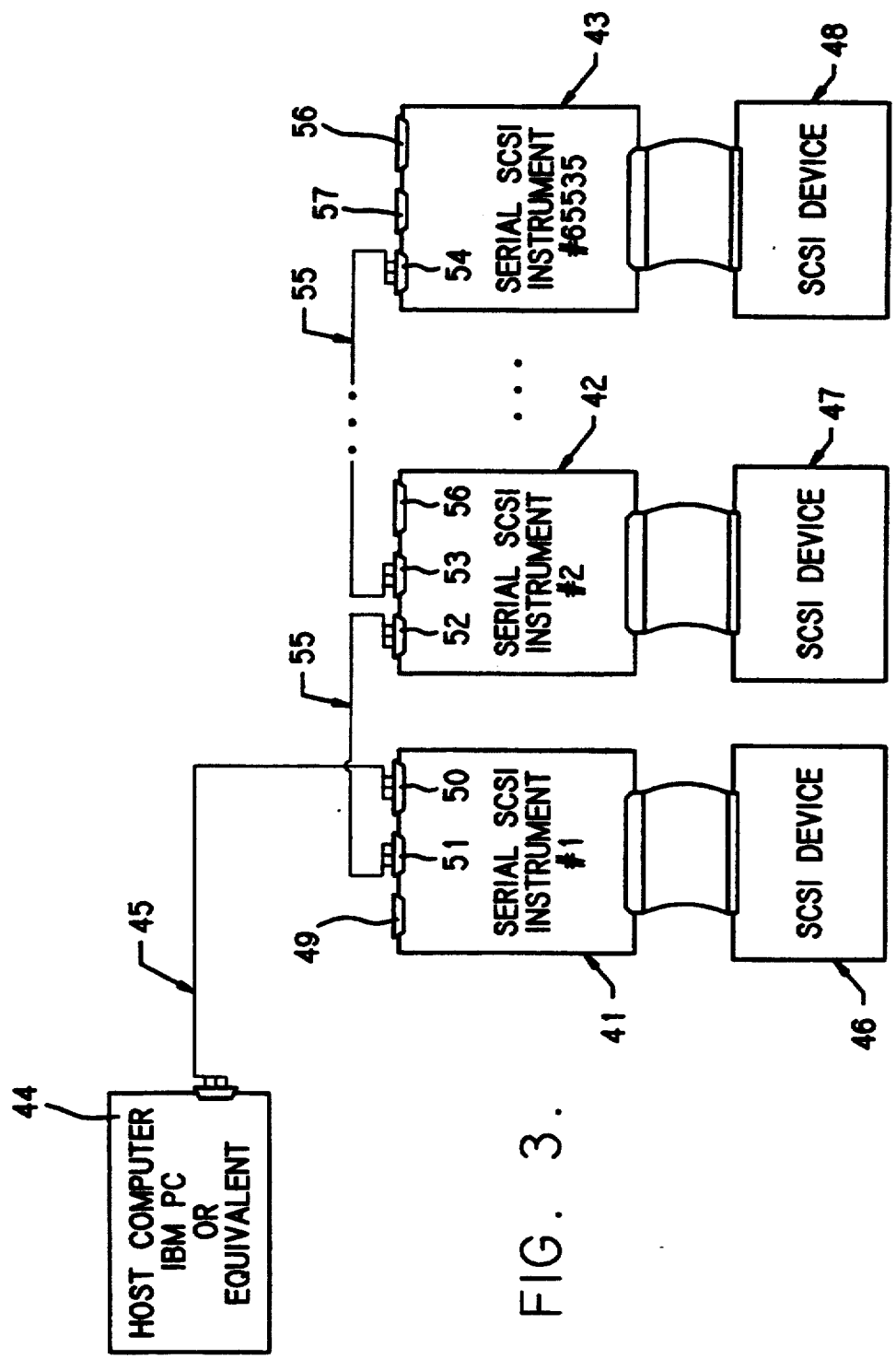
FIG. 3 is a schematic representation of a series of converters attached to an IBM Personal Computer.

FIG. 3 shows a group of converters 41, 42, 43 attached to an IBM PC Host Computer System 44 utilizing a 3-wire RS-232 link 45. Each of the converters 41, 42, 43 are attached to a single SCSI Device 46, 47, 48; if desired up to 7 SCSI Devices may be attached to each converter. Notice that the Upstream RS-232 Connector 50 is used. Connection between the first Instrument 41 and the next Downstream Instrument 42 is made via the Downstream connector 51 of the first Instrument 41 and the Upstream connector 52 of the next Instrument 42. This pattern is repeated using the Downstream Connector 53 of the Instrument 42 to attach to the Upstream Connector 54 of the next Instrument 43 in the serial link. Standard 10-conductor flat cables 55 are used to interconnect all instruments in a serial link; the only exception is the 3-wire RS-232 link 45 to the Host Computer 44. Also note that the RS-232 connectors 56 are not used to interconnect instruments. Finally, the Downstream Connector 57 of the last Instrument 43 in a serial network is not used.

A sample test sequence is as follows. The set-up of a test sequence for a particular device begins with making a logical connection between the host computer and the converter attached to the device. The instructions defining the test sequence would then be downloaded to the converter. Following download the host could then disconnect from the converter and wait until a resultant test report is ready to be uploaded. The actual download process consists of a string of ASCII characters flowing downstream from the host to the converter's network processor.

Inside the converter, the network processor compiles the test sequence instructions into a set of commands and data which are sent to the device processor. The device processor carries out the actual device operations and reports status and data back to the network processor. The network processor creates a resultant test report and alerts the host that a report is ready. The host then re-connects to the converter and uploads the resultant test report. Re-connection is only necessary if the host were logically disconnected from the converters. The actual upload process consists of a string of ASCII characters flowing upstream from the converter to the host.

A typical sequence of test instructions for a disk drive device might be as follows:

1. Format the device.
2. Write data patterns to the device.
3. Read from the device and verify that the proper patterns are read back.
4. Report all instances of data errors where the readback pattern did not match the written pattern.
5. Repeat steps 2, 3, and 4 for various data patterns and compile a map of media defects as part of a resultant test report.

Figure 4:
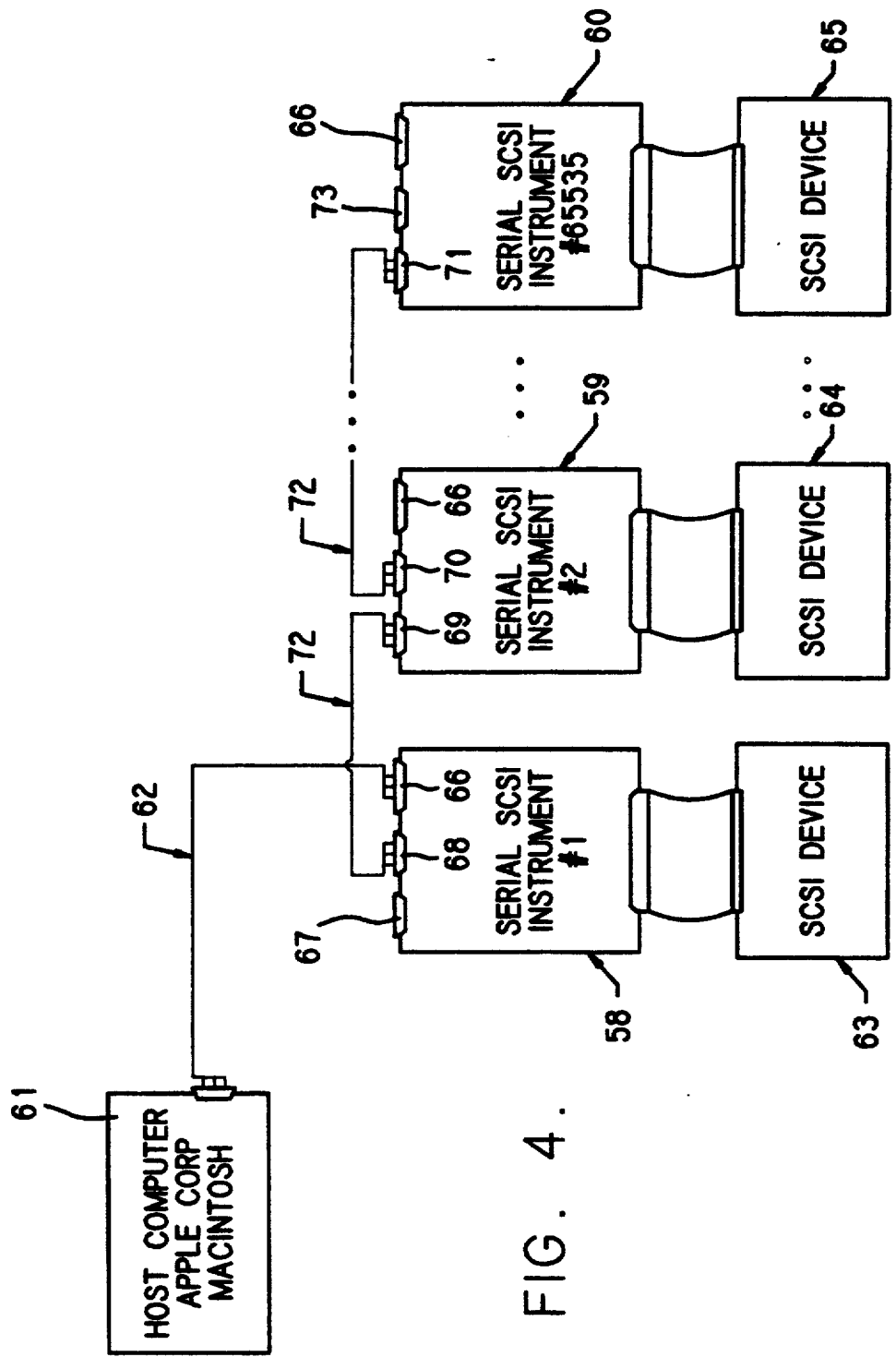
FIG. 4 is a schematic representation of a series of converters attached to an Apple Macintosh Computer.

FIG. 4 shows a group of converters 58, 59, 60 attached to an Apple Corporation MACINTOSH System 61 utilizing a 4-signal RS-422 link 62. Each of the converters 58, 59, 60 are attached to a single SCSI Device 63, 64, 65; if desired up to 7 SCSI Devices may be attached to each converter. Notice that in this configuration none of the RS-232 connectors 66 are used; in this case the Host Computer utilizes a 4-signal RS-422 serial link Instrument. Connection between the first Instrument 58 and the next Downstream Instrument 59 is made via the Downstream connector 68 of the first Instrument 5 and the Upstream connector 69 of the next Instrument 59. This pattern is repeated using the Downstream Connector 70 of the Instrument 59 to attach to the Upstream Connector 71 of the next Instrument 6 in the serial link. Standard 10-conductor flat cables 72 ar used to interconnect all instruments in a serial link; the only exception is the serial cable 62 to the Host Computer 61 which requires a round cable adapter. Finally, the Downstream Connector 73 of the last Instrument 60 in a serial network is not used.

Figure 5A:
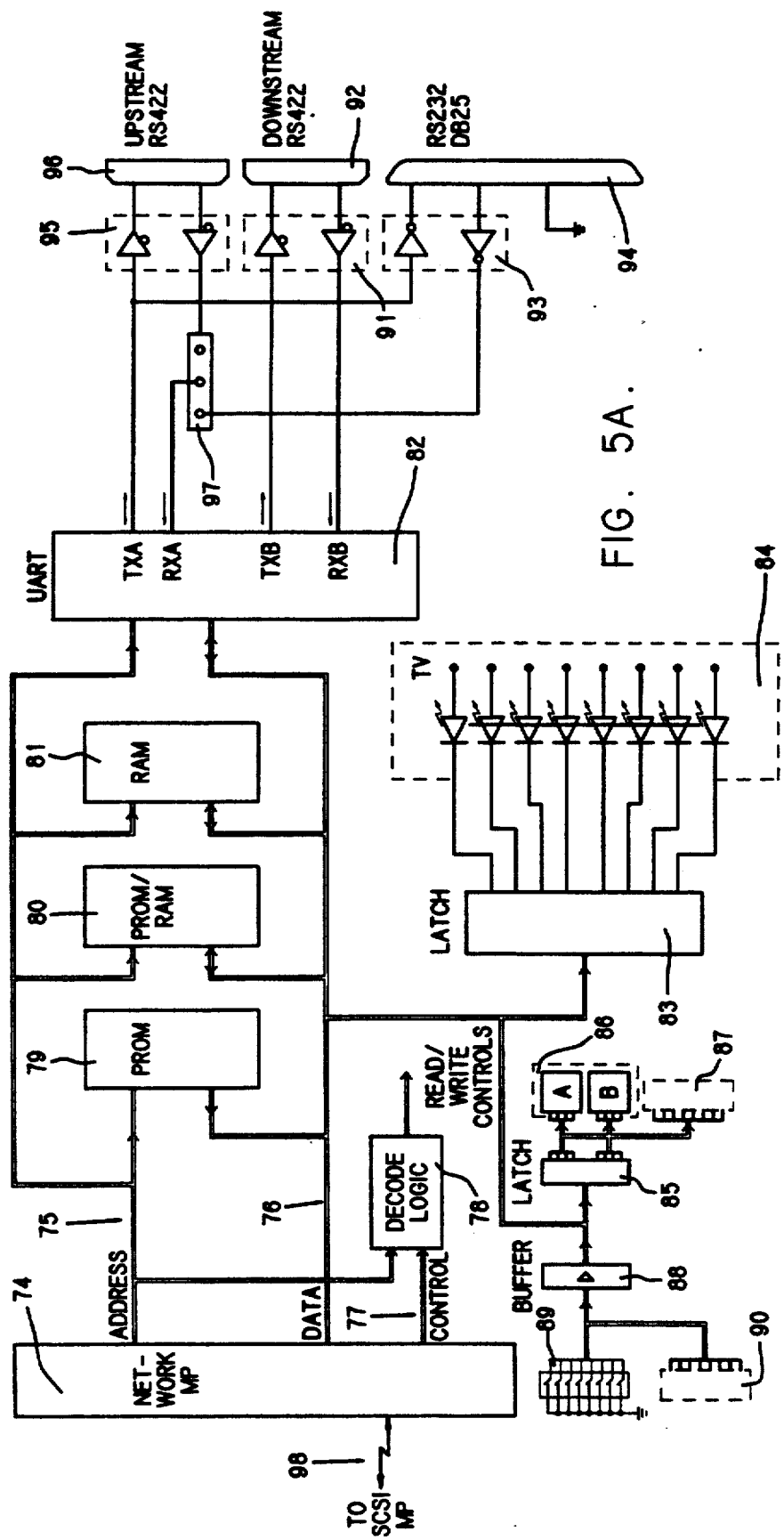
FIGS. 5A, 5B, 5C are a logic circuit diagram of the converter.

FIG. 5A illustrates the logic circuitry of the built-in Network processing system contained within each converter. The Network Microprocessor 74 generates address 75, data 76 and control signals 77 which enable communications with attached peripherals. In addition, decode logic 78 generates the proper read/write control signals to all the attached peripherals. The peripheral devices attached to the Network Microprocessor 74 are the Program Memory 79, an Auxiliary Memory 80, a Data Memory 81, a Data Latch 85 with attached alphanumeric Displays 86 and Optional User Output Port 87, and a Tri-State Buffer 88 for reading mode switches 89 or optional User Input Port 90. The Auxiliary Memory 80 may operate as either program memory or data memory which allows new programs to be down loaded to the Network Microprocessor. One channel of the UART is attached to the Downstream RS-422 drivers and receivers 91 and in turn the Downstream Connector 92. The other channel of the UART is connected to either the RS-232 drivers and receivers 93 and associated RS-232 DB25 connector or to the Upstream RS-422 drivers and receivers 95 and associated Upstream Connector 96; the selection is made via a Jumper 97. The Network Microprocessor 74 is attached to the SCSI Microprocessor 99 via an internal Serial Link 98.

Figure 5B:
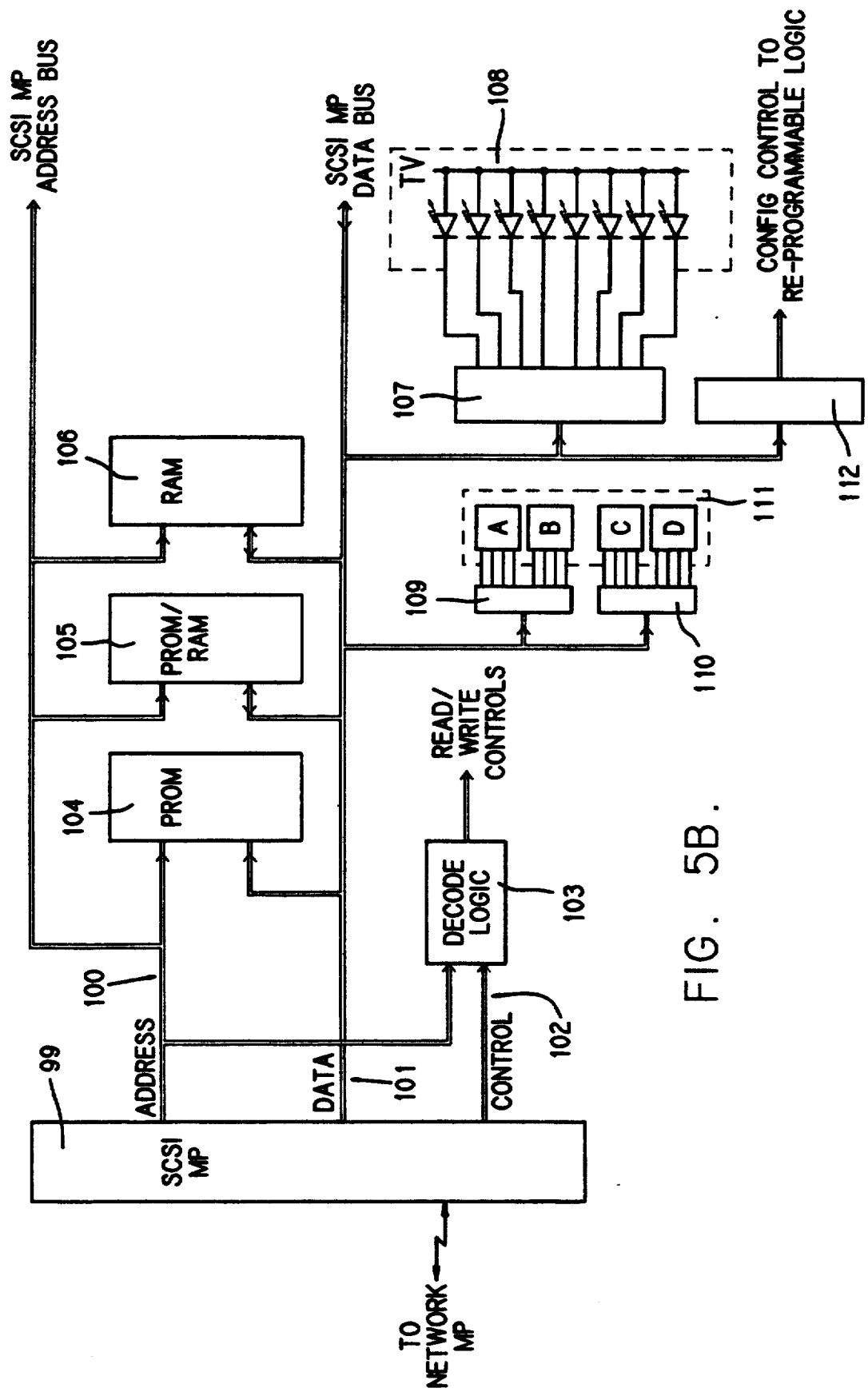
Figure 5C:
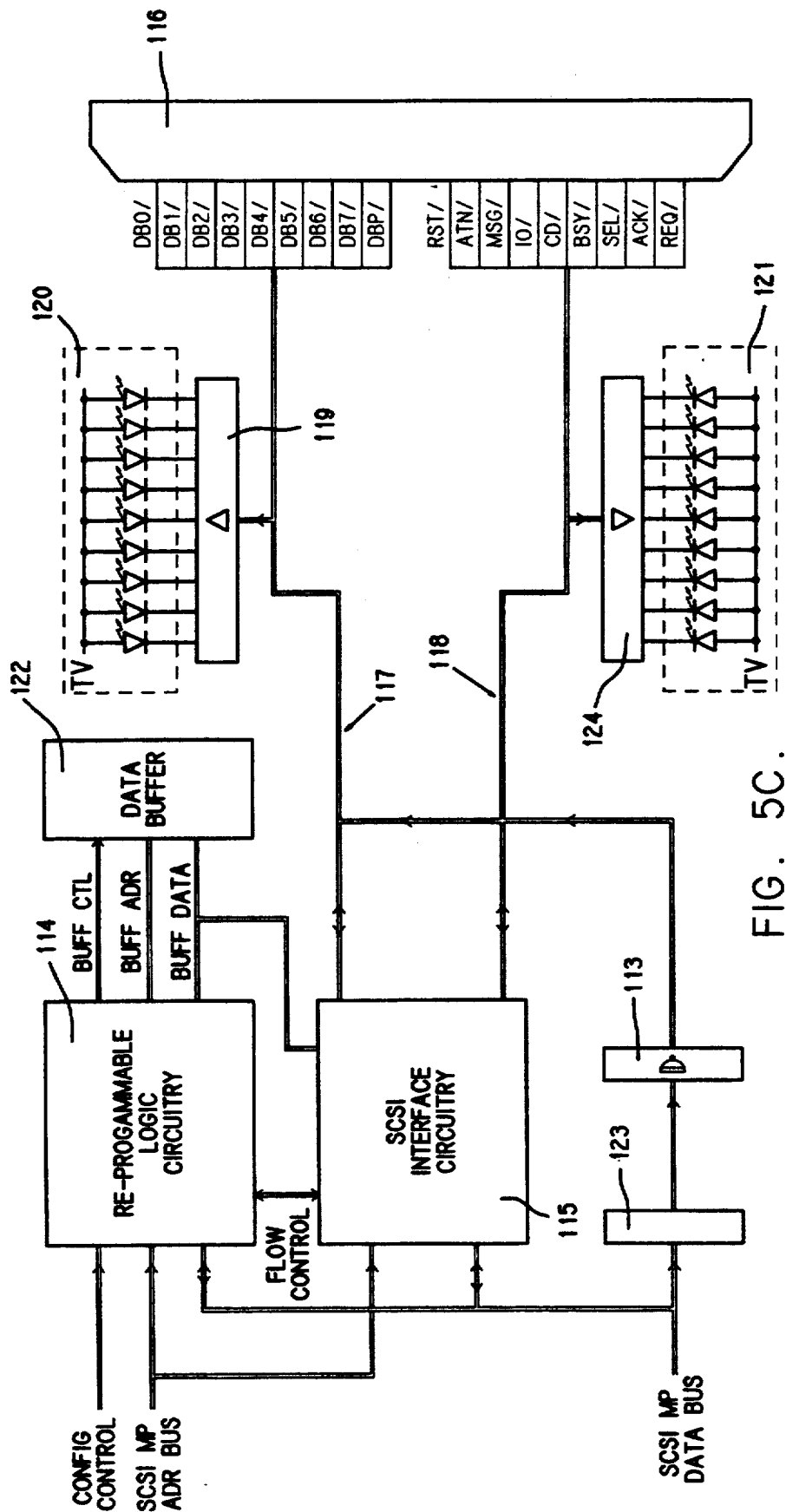

FIG. 5B and 5C illustrate the logic circuitry of the built-in SCSI processing system contained within each converter. The SCSI Microprocessor 99 generates address 100, data 101 and control signals 102 which enable communications with attached peripherals. In addition, decode logic 103 generates the proper read/write control signals to all the attached peripherals. The peripheral devices attached to the SCSI Microprocessor 99 are the program memory 104, an auxiliary memory 105, a data memory 106, a data latch 107 with attached LEDs 108, two data latches 109, 110 with attached alphanumeric displays 111, a data latch 112 for configuration control of re-programmable logic, a data latch 123 with associated open-collector cable drivers 113 for SCSI Bus diagnostics, Reprogrammable Logic Circuitry 114 and SCSI Interface Circuitry 115. The Auxiliary Memory 105 may operate as either program memory or data memory which allows new programs to be down loaded to the SCSI Microprocessor. The Reprogrammable Logic circuitry may be reconfigured at any time via down loading a new configuration definition to the SCSI Microprocessor. The SCSI Microprocessor 99 is attached to the Network Microprocessor 74 via an Internal Serial Link 98.

FIG. 5C also illustrates the Logic Circuitry for analyzing and managing the SCSI Bus. The SCSI Interface Circuitry 115 drives and receives signal onto the SCSI Connector. The diagnostic cable drivers 113 may also drive the SCSI Bus in the event of self-test or error simulation. The SCSI Signals consist of 9 Data Signals 117 and 9 Control/Status Signals 118. Attached to the SCSI Data Signals 117 are Buffers 119 and Associated LEDs 120. Attached to the SCSI Control/Status Signals 118 are Buffers 124 and Associated LEDs 121. The SCSI Interface Circuitry 115 is also attached to the Reprogrammable Logic Circuitry 114 and to a Data Buffer Memory 122; this allows shared access to the Buffer Memory 122 as well as pattern generation and verification in real time.

Though the invention has been described with respect to a specific preferred embodiment, many variations and modifications will immediately become apparent to those skilled in the art. This is particularly true with respect to this circuit as it has been implemented here. That circuitry may be implemented as a combination of analog circuitry and digital circuitry. Further the digital aspects of an implementation of this invention may be achieved in any variety of software implementations which achieve the functions of this invention. It is further the expectation that the substance of this invention could be implemented in technologies not presently known or existing. Therefore it is the intention that the appended claims be interpreted as broadly as possible in view of the prior art to include all such variations and modifications.

What is claimed is:

1. A network system for serially connecting a host processing system to plurality of computer peripherals, for testing said plurality of computer peripherals, the network comprising:
   a host processing system for sending and receiving tokens, wherein the received tokens include resultant test reports, which are further processed and displayed, and the sent tokens include instructions defining a test sequence and configuration commands, N programmable test systems,
   a first serial connection between the host processing system and a first of the N programmable test systems,
   N - 1 serial connections, providing a serial connection between the first of the N programmable test systems and a next programmable test system, each such programmable test system connected to a next one of said programmable test systems, until all N of said programmable test systems are connected one-to-one by a serial connection,
   a bus attached to each of said programmable test system, and the bus is connected to one or more of said plurality of computer peripherals to be tested,
   each programmable test system comprising:
      a network processing system, wherein the network processing system includes:
      means for receiving, sending and regenerating the tokens,
      means for performing network addressing function and maintaining logical continuity along all of said serial connections,
      first means for generating test information in response to said instructions defining a test sequence,
      second means or generating a resultant test report in response to result information generated by a test processing system,
      means for signaling the host processing system, that the resultant test report is ready for sending and sending upon the host processing system request,
      means or interfacing with the test processing for sending at least the test information and the configuration commands and receiving at least the result information, and
   test processing system including:
      first means for interfacing with the network processing system for sending at least the result information and receiving at least the test information and the configuration commands,
      means or reconfiguring in response to the configuration commands sent by the host processing system,
      means for generating test patterns on the bus,
      means or verifying a response from the bus to the test patterns,
      means for logging errors, in response to the verification, as a part of the result information,
      a second means for interfacing with the bus, including means for operating under the protocol of the bus.

2. The network system of claim 1, wherein the test processing system includes a microprocessor.

3. The network system of claim 1, wherein the plurality of computer peripherals includes at least one data storage device.

4. The network system of claim 1, wherein at least one of the plurality of computer peripherals employs small computer system interface (SCSI).

5. The network system of claim 1, wherein the network processing system includes a microprocessor.

* * * * *